UNITED STATES PATENT OFFICE 2,393,165

TREATMENT OF WELL DRILLING FLUIDS

Raymond W. Hoeppel, Arcadia, Calif., assignor to National Lead Company, Los Angeles, Calif., a corporation of New Jersey No Drawing. Application April 7, 1943,
Serial No. 482,209

15 Claims. (Cl. 252—8.5)

This invention relates to the treatment of well drilling fluids, and more particularly to the treatment of such fluids which are subject to contamination by sulfate ions during the course of drilling.

In the drilling of wells, more particularly oil and gas wells, by the employment of a mud-laden drilling fluid, as in the rotary system of drilling, the material of the formation enters the fluid; sometimes by reason of seepage or otherwise, a contaminating material enters the fluid. In both cases the character of the fluid may be affected by such contamination; this is particularly true where the contamination is by sulfate ions, as by calcium sulfate in the form of gypsum or anhydrite, and, although to a less extent, by sodium sulfate. Gypsum and anhydrite are particularly troublesome, because they disadvantageously affect the viscosity, gel-strength, pH and water loss of the fluid. These are also found in some mud bases, viz., in many clays considered unusable for drilling mud purposes, because of the poor qualities of the mud produced when the latter are mixed with water.

One of the objects of this invention, therefore, is to provide means for counteracting the effect of such sulfate ions or to inhibit their effect.

Another object is to provide a process involving the addition to the fluid of a sulfate-ion counteracting or inhibiting agent.

Another object is to provide a process for reclaiming otherwise unusable native clays for drilling mud purposes.

Further objects will appear from the detail description in which will be set forth illustrative embodiments of this invention; it will, however, be understood that this invention is susceptible to various embodiments within the scope of the appended claims.

Generally stated, and in accordance with an illustrated embodiment of this invention where an aqueous mud-laden drilling fluid is substantially contaminated by sulfate ions, the effect of the sulfate ions is counteracted or inhibited by introducing into the fluid a counteracting agent. A mud base such as a clay may also be treated with the agent before its conversion to a drilling fluid, and this agent may also be incorporated with other mud bases such as bentonite or barium sulfate. An agent, which will effect this purpose, is generally stated to be a salt of an acid whose calcium salt is insoluble in the drilling fluid, and of a base whose sulfate salt is insoluble, and which itself is sufficiently soluble in the drilling fluid to react with sulfates in the fluid.

A practically effective agent for the above described purpose is barium carbonate whose action is as follows:

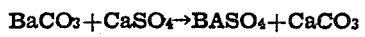

It will be seen that the conversion is one of metathesis, because barium carbonate, while generally considered insoluble, is sufficiently soluble in the drilling fluid to bring about the above reaction. The two resulting compounds are, however, insoluble in the fluid and inert and have no disadvantageous effect upon the fluid; in fact, both are mud weighting materials and are in use as such.

Barium carbonate can be employed in its natural state as it occurs in witherite; however, a precipitated form is particularly useful and can be cheaply produced from barytes ($BaSO_4$) by calcination with coke to form barium sulphide, from a solution of which barium carbonate can be precipitated by sodium carbonate.

When sodium sulfate is the contaminant, the elimination of the same is as follows:

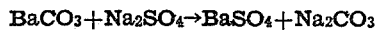

By the above reaction barium carbonate will convert the more detrimental sodium sulfate present in the mud to the less detrimental sodium carbonate; the latter salt moreover acts as a scavenger for flocculating calcium ions, and in this respect will condition cement-contaminated drilling fluids.

While barium carbonate is particularly useful for the above purposes, other compounds may be used, among which are many barium and strontium salts of carbonic, oxalic, ortho-phosphoric and tartaric acids. Examples of these are: barium oxalate, barium tartrate, barium acid orthophosphate strontium oxalate and strontium tartrate; all of these are sufficiently soluble in a drilling fluid to react with calcium and sodium sulfates by metathesis, in a manner similar to barium carbonate, and to form precipitates which are substantially inert and are even mud weighting materials. Of these strontium carbonate can be used in its natural form of strontionite. Here again it is advantageous to employ all of these compounds in precipitated form.

The counteracting or inhibiting compound may be employed in any suitable manner as by adding it to the drilling fluid to become mixed therewith. The compounds may be employed to counteract the sulfate ions already in the fluids; however, it is advantageous to add them to the fluid a substantial period before such contamination is liable to occur. This can be readily determined, for example, with gypsum or anhydrite by adding the compound to the fluid a substantial period before the drill reaches the formation containing the same, as determinable from previous well logs of neighboring wells. In this way the fluid will be maintained in its previously prepared condition and less of the compound will be required.

I

A 5.5% (solids) California bentonite water fluid was "cut," that is, contaminated, with gypsum and treated with barium carbonate with the following results:

| No. | BaCO₃ | Gypsum | Initial | | | | After 24 hours at 160°F. | | | |
|---|---|---|---|---|---|---|---|---|---|---|
| | | | Visc. | Ini. gel | Fin. gel | 30′ water loss | Visc. | Ini. gel | Fin. gel | 30′ water loss |
| | Lb./bbl. | Lb./bbl. | Centipoises | Grams | Grams | Milliliters | Centipoises | Grams | Grams | Milliliters |
| (1) | 0 | 0 | 21.8 | 20 | 76 | 12.5 | 21.8 | 20 | 76 | 12.5 |
| (2) | 1.4 | 0 | 20.8 | 20 | -------- | 12.3 | -------- | -------- | -------- | -------- |
| (3) | 7.0 | 0 | 20.8 | 18 | 70 | 12.8 | -------- | -------- | -------- | -------- |
| (4) | 14.0 | 0 | 20.5 | 20 | -------- | 13.9 | -------- | -------- | -------- | -------- |
| (5) | 0 | 1.4 | 31.2 | 76 | 90 | 24.2 | 22.0 | -------- | -------- | 30.3 |
| (6) | 1.4 | 1.4 | 38.2 | 96 | 115 | 16.2 | 46.0 | -------- | -------- | 17.9 |
| (7) | 7.0 | 1.4 | 27.0 | 44 | 86 | 14.8 | 12.2 | -------- | -------- | 15.0 |
| (8) | 14.0 | 1.4 | 28.2 | 46 | -------- | 13.8 | 12.2 | 5 | 42 | 14.0 |

The amount of the counteracting or inhibiting compound to be employed will depend upon the nature and proportion of the sulfate which has, or is liable, to enter the fluid; for the action is one of counteracting or inhibiting the effect of the sulfate ion. Where the compound is one which itself is otherwise inert, and otherwise produces resulting compounds which are inert, an excess can do no harm and may, in fact, improve the drilling fluid. This is particularly true of barium carbonate which itself is a mud-weighting material and results in compounds which are mud-weighting materials.

While the addition of barium carbonate reduces the viscosity and gel strength of the fluid, particularly after the fluid has been subjected to heat (as happens at the bottom of a deep well), although the water loss is materially decreased, the viscosity can be restored or raised to the desired point and the water loss still further decreased by the addition of bentonite. The viscosity can in such a case be controlled by the addition of a viscosity-reducing agent, such as a tannin in the form of quebracho or chestnut extract, caustic and a tannin, or a polyphosphate, such as disodium-di-hydrogen pyrophosphate.

In the above test the viscosity was determined by a Stormer viscosimeter in centipoises (cpe.), the gel strength (g) is in grams, and the water loss which is in milliliters (ml.), after (30′) was determined by standard procedure.[1]

It will be seen from a comparison of tests (1), (5) and (7) that although the addition of gypsum has unduly increased the viscosity gel strength and water loss,[2] upon the addition of barium carbonate the viscosity and water loss have been reduced. However, it will be seen that upon heating the fluid, the water loss has been substantially restored, while the viscosity and gel strength have been actually decreased. This is, of course, an advantage because, as noted above, during drilling of particular deep wells the drilling fluid is subjected to heating. It will also be seen from test No. (8) that an excess of barium carbonate does not adversely affect the characteristics of the fluid, which is of advantage, because the cheap material, barium carbonate, may be added at will.

II

A Mojave mud, known as P-34, made up into a drilling fluid of 18 cpe. and containing 40% solids, was "cut" with gypsum and then treated with barium carbonate with the following results:

| No. | BaCO₃ | Gypsum | Initial | | | | After 20 hours at 155° F. | | | |
|---|---|---|---|---|---|---|---|---|---|---|
| | | | Visc. | Ini. gel | Fin. gel | 30′ water loss | Visc. | Ini. gel | Fin. gel | 30′ water loss |
| | lb./bbl. | lb./bbl. | Centipoises | Grams | Grams | Milliliters | Centipoises | Grams | Grams | Milliliters |
| (1) | 0 | 0 | 20.8 | 7 | 61 | 8.8 | 24.0 | 10 | 71 | 8.6 |
| (2) | 0 | 1.75 | (¹) | -------- | -------- | 13.2 | (¹) | -------- | -------- | 13.6 |
| (3) | 3.5 | 1.75 | 23.8 | 25 | 74 | 9.5 | 22.0 | 10 | 66 | 9.1 |
| (4) | 7.0 | 1.75 | 23.8 | 24 | 76 | 10.2 | 22.8 | 11 | 61 | 8.9 |

¹ Plastic.

The materials may be furnished to the driller in a dry state as a prepared composition, viz: barium carbonate admixed with a mud base such as an emulsoid colloid of the character described in the Harth Patent 1,991,637, such as a concentrated colloidal clay like bentonite; barium carbonate having admixed therewith a mud thinner, such as caustic and quebracho; barium carbonate having admixed therewith another mud-weighting material, such as barium sulfate, with or without a mud thinner and with or without bentonite. It will be seen that the components of the admixtures are not only compatible, but this is particularly true of barytes and bentonite as related to barium carbonate.

In order to illustrate the practical application of this invention, the following tests and results will be given.

It will be seen from a comparison of tests (2) and (3), that while the fluid became plastic with increased water loss, an addition of only 1% barium carbonate (3.5 pounds per barrel), restored the fluid to operable conditions of viscosity, gel strength and water loss. Further from test (4), it will be seen that again an excess of barium carbonate does not disadvantageously affect the fluid, but indeed improves it.

III

A Butte field (Wyoming) mud was made into a drilling fluid so as to contain 30% solids at a

[1] See Drilling Mud, May, 1940, pp. 4 etc., describing the above procedure, or American Petroleum Institute Code No. 29.

[2] The apparent erratic behavior of test No. (6) is due to the passage of the mud through a critical thixotropic region.

viscosity of 18 cpe. and was "cut" with 1½ pounds per barrel of gypsum. This was then treated with barium carbonate with the following results:

had been heated 20 hours at 160° F. The effectiveness of the treatment seems to be enhanced somewhat by the heating. The optimum treat-

| No. | BaCO₃ added | Initial | | | | | | After 20 hours at 160° F. | | | | | |
|---|---|---|---|---|---|---|---|---|---|---|---|---|---|
| | | Visc. | Ini. gel | Fin. gel | pH | 30' water loss | Cake 32nds" | Visc. | Ini. gel | Fin. gel | pH | 30' water loss | Cake 32nds |
| | lb./bbl. | Centipoises | Grams | Grams | | Milliliters | | Centipoises | Grams | Grams | | Milliliters | |
| (1) | 0 | 40.0 | 96 | 75 | 7.80 | 64.6 | 12 | 35.0 | 83 | 65 | 8.10 | 59.0 | 11 |
| (2) | 1.75 | 44.0 | | | 8.33 | | | | | | | | |
| (3) | 2.80 | 23.0 | | | 8.58 | 57.0 | 12 | 27.0 | 60 | 65 | 8.28 | 55.6 | 11 |
| (4) | 3.50 | 14.7 | 27 | 65 | 8.78 | 34.8 | 8 | 22.5 | 36 | 65 | 8.30 | 37.8 | 8 |
| (5) | 5.25 | 8.9 | 3 | 30 | 9.28 | 23.6 | 6 | 11.0 | 1 | 13 | 9.05 | 15.3 | 5 |
| (6) | 7.00 | 8.0 | 2 | 37 | 9.35 | 25.2 | 6 | 10.4 | 2 | 28 | 9.20 | 18.0 | 5 |
| (7) | 8.75 | 9.4 | 2 | 35 | 9.48 | 21.0 | 6 | 12.2 | 2 | 22 | 9.05 | 17.8 | 5 |
| (8) | 17.50 | 10.6 | 1 | 28 | 9.35 | 19.2 | 5 | 14.0 | 2 | 35 | 8.84 | 16.0 | 5 |

The analysis of the filtrate from final water loss determinations showed the following:

| No. | Ca as CaCO₃ | Mg as CaCO₃ | SO₄ as Na₂SO₄ | Ba as Na₂SO₄ | PO₄ | Cl as NaCl |
|---|---|---|---|---|---|---|
| | Gr./gal. | Gr./gal. | Gr./gal. | Gr./gal. | Ppm. | Gr./gal. |
| (1) | 60 | 5.5 | 275 | 0 | 2 | 2 |
| (2) | | | | | | |
| (3) | 27 | 2.7 | 200 | | | |
| (4) | 6 | 0 | 150 | | | |
| (5) | 1.5 | | | 1 | | |
| (6) | 1.6 | 0 | | 2 | | |
| (7) | 2.0 | 0 | | 0 | | |
| (8) | | | | 0 | | |

It will be seen from a comparison of tests (1) and (5) that the viscosity, gel strength, water loss and mud cake (in thirty seconds of an inch) have been reduced to satisfactory values, and that this is particularly true when the fluid has been subjected to heat. Although the pH (taken by Beckman meter) has been raised, this is of advantage. It will further be seen from tests (6), (7) and (8) that even a large excess of barium carbonate may be added with even improved results. Barium carbonate, in an amount of 5.0 or more pounds per barrel (42 gallons) of mud, very effectively reduced the viscosity, gel strengths, and water loss of the mud within 30 minutes after its addition and these characteristics remained satisfactory throughout the heat treatment (as shown). The viscosity was reduced from 35 to 11 cpe. and the 30-minute water loss from 59 to 15.3 ml., when 5¼ lb./bbl. BaCO₃ was used. A large excess (17.5 lb./bbl.) of barium carbonate produced approximately the same results. These refer to tests made after the muds had been heated 20 hours at 160° F. The effectiveness of the treatment seems to be enhanced somewhat by the heating. The optimum treatment with barium carbonate reduced the calcium concentration of the filtrate from 60 to 1.5 gr./gal. (expressed as CaCO₃), the magnesium concentration from 5.5 to 0 gr./gal. and the sulfate content from 275 to 2 gr./gal. (expressed as Na₂SO₄) (as shown). Even with a large excess of barium carbonate, there was present no measurable barium ion in the filtrate.

IV

The drilling fluid of III which had been treated with 7 pounds per barrel of barium carbonate (see test (6) of III) was treated with Wyoming bentonite and caustic quebracho (10% solution of quebracho extract in 0.16 N, NaOH, giving a solution having a pH of 9.5) with the following results:

| No. | Amt. | Type | Initial | | | | | After 20 hours at 160° F. | | | | |
|---|---|---|---|---|---|---|---|---|---|---|---|---|
| | | | Visc. | Ini. gel | Fin. gel | pH | 30' water loss | Visc. | Ini. gel | Fin. gel | pH | 30' water loss | Cake 32nd" |
| | Lb./bbl. | | Centipoises | Grams | Grams | | Milliliters | Centipoises | Grams | Grams | | Milliliters | |
| (1) | 0 | Blank | 8.0 | 2 | 37 | 9.35 | 25.2 | 10.4 | 2 | 28 | 9.20 | 18.0 | 5 |
| (2) | 3.5 | Wyo. bentonite | 27.0 | 15 | 110 | 9.30 | 13.2 | 28.0 | 5 | 65 | 8.92 | 12.4 | 4 |
| (3) | {3.5 / 0.1} | {Wyo. bentonite / Caustic-quebracho} | 17.8 | 1 | 21 | 9.12 | | | | | | | |
| (4) | {3.5 / 0.3} | {Wyo. bentonite / Caustic-quebracho} | 16.0 | 1 | 7 | 9.08 | 11.3 | 22.5 | 2 | 12 | 8.75 | 11.4 | 3 |

It will be seen from a comparison of tests (1) and (2), that the addition of bentonite has increased the viscosity and gel strength without substantial alteration of pH, but has further decreased the water loss and thickness of the cake. It will, however, be seen from tests (3) and (4), particularly the latter, that the addition of a mud thinner has decreased the viscosity and gel strength without further affecting the water loss, the cake thickness and the pH. The following is a summary of treatment IV: The addition of 3½ lb./bbl. of Wyoming aquagel to the mud previously treated with 7 lb./bbl. barium carbonate raised the viscosity, after 20 hours at 160° F. from 10.4 to 28 cpe. and reduced the water loss from 18 to 12.4 ml./30 min. (as shown). However, rather high gel strengths resulted. Treatment of the mud containing Wyoming bentonite with caustic-quebracho resulted in a comparatively lower viscosity even after heating, a substantial reduction in gel strength and pH and a water loss of 11.4 ml./30 min.

The following summary will conveniently illustrate treatments III and IV:

|  | Original mud no treatment | Barium carbonate treatment | Barium carbonate+ Aquagel-quebracho treatment |
|---|---|---|---|
| Viscosity_____centipoises__ | 35 | 11 | 22 |
| Ini. gel_____grams__ | 83 | 1 | 2 |
| Fin. gel_____do____ | 65 | 13 | 12 |
| pH_____ | 8.1 | 9.0 | 8.8 |
| 30′ water loss___milliliters__ | 59 | 15.3 | 11.4 |
| Cake thickness (32nd′)_____ | 11 | 5 | 3 |

It will, therefore, be seen that the invention accomplishes its objects; for from the consideration of the above tests where, for example, the contaminant is calcium sulfate and the treating agent is barium carbonate, particularly when followed by treatments with bentonite and caustic quebracho, the following will be seen:

Calcium sulfate is almost completely removed from the mud provided slightly more than an equivalent quantity of barium carbonate is present. No anions or cations are added to the mud, thus maintaining a high degree of dispersion of the colloids. The mud is restored to its original condition; in fact, in most instances the mud is restored to an even more disperse condition than the original, probably due to the removal of the flocculating calcium and sulfate ions present in the mud-making material or in the make-up water. The mud remains conditioned even after long periods of heating; in fact heating actually improves the mud. No detrimental change in pH accompanies the action of barium carbonate. A large excess of barium carbonate does no appreciable harm to the mud and hence large overtreatments are permissible. The action of the barium carbonate is rapid, about 90% of the conditioning occurring within 20 minutes after its addition to the mud. Both the barium carbonate, and the barium sulfate (barytes) formed during its action as a conditioner, are good weighting materials and aid in raising the density of the mud. Barium carbonate, being non-hygroscopic, non-corrosive, clean and non-inflammable, is readily shipped and handled.

Where sodium sulfate is present or liable to be encountered as a contaminant, barium carbonate will convert the sodium sulfate present to the less detrimental sodium carbonate; indeed, the latter salt acts as a scavenger for flocculating calcium ions, which may be introduced or encountered, particularly if the mud should become or is liable to become "cement cut."

While this invention is applicable for the purpose of counteracting or inhibiting the action of sulfate ions introduced or liable to be introduced into a drilling fluid in the course of drilling, the invention is also applicable for the conditioning of clays, which themselves are contaminated. Many native clays are now regarded as worthless, because of their high content of sulfate ions, particularly in the form of gypsum. These can be converted into good drilling muds or fluids by the employment of barium carbonate or other barium or strontium compounds previously described.

Having thus described the invention, what is claimed is:

1. In the art of drilling wells by the employment of an aqueous mud-laden fluid substantially contaminated by sulfate ions during the course of drilling, the process comprising, adding to such a fluid a salt of an acid whose calcium salt is insoluble and of a base whose sulfate salt is insoluble and which itself is sufficiently soluble to react with sulfates so occurring in the drilling fluid.

2. In the art of drilling wells by the employment of an aqueous mud-laden fluid substantially contaminated by sulfate ions during the course of drilling, the process comprising adding to such a fluid a salt of a group consisting of the barium and strontium salts of carbonic, oxalic, orthophosphoric and tartaric acids and which salt is sufficiently soluble to react with sulfates so occurring in the drilling fluid.

3. In the art of drilling wells by the employment of an aqueous mud-laden fluid substantially contaminated by calcium sulfate during the course of drilling, the process comprising, adding to such a fluid a salt of an acid whose calcium salt is insoluble and of a base whose sulfate salt is insoluble and which itself is sufficiently soluble to react with sulfates so occurring in the drilling fluid.

4. In the art of drilling wells by the employment of an aqueous mud-laden fluid substantially contaminated by calcium sulfate during the course of drilling, the process comprising, adding to such a fluid a salt of a group consisting of the barium and strontium salts of carbonic, oxalic, orthophosphoric and tartaric acids and which salt is sufficiently soluble to react with sulfates so occurring in the drilling fluid.

5. In the art of drilling wells by the employment of an aqueous mud-laden fluid substantially contaminated by calcium sulfate during the course of drilling, the process comprising, adding to such a fluid barium carbonate.

6. In the art of drilling wells by the employment of an aqueous mud-laden fluid substantially contaminated by sulfate ions during the course of drilling, the process comprising, adding to such a fluid a salt of a group consisting of the precipitated barium and strontium salts of carbonic, oxalic, orthophosphoric and tartaric acids and which salt is sufficiently soluble to react with sulfates so occurring in the drilling fluid.

7. In the art of drilling wells by the employment of an aqueous mud-laden fluid substantially contaminated by calcium sulfate during the course of drilling, the process comprising, adding to such a fluid precipitated barium carbonate.

8. In the art of drilling wells by the employment of an aqueous mud-laden fluid substantially contaminated by sulfate ions during the course of drilling, the process comprising, adding to such a fluid a substantial period before such contamination, a salt of an acid whose calcium salt is insoluble and of a base whose sulfate salt is insoluble and which itself is sufficiently soluble to react with sulfates so occurring in the drilling fluid.

9. In the art of drilling wells by the employment of an aqueous mud-laden fluid substantially contaminated by calcium sulfate during the course of drilling, the process comprising, adding to such a fluid a substantial period before such contamination, barium carbonate.

10. In the art of drilling wells by the employment of an aqueous mud-laden fluid substantially contaminated by sulfate ions during the course of drilling, the process comprising, adding to such a fluid a salt of an acid whose calcium salt is insoluble and of a base whose sulfate salt is insoluble and which itself is sufficiently soluble to react with sulfates so occurring in the drilling fluid and adding to the fluid a concentrated emulsoid colloid and a mud thinner.

11. In the art of drilling wells by the employment of an aqueous mud-laden fluid substantially contaminated by calicum sulfate during the course of drilling, the process comprising, adding to such a fluid a salt of an acid whose calcium salt is insoluble and of a base whose sulfate salt is insoluble and which itself is sufficiently soluble to react with sulfates so occurring in the drilling fluid and adding to the fluid a concentrated colloidal clay.

12. In the art of drilling wells by the employment of an aqueous mud-laden fluid substantially contaminated by calcium sulfate during the course of drilling, the process comprising, adding to such a fluid barium carbonate and adding bentonite to the fluid.

13. In the art of drilling wells by the employment of an aqueous mud-laden drilling fluid, the process comprising treating a mud base containing sulfate ions, and before its conversion to a fluid, with a salt of an acid whose calcium salt is insoluble and of a base whose sulfate salt is insoluble and which itself is sufficiently soluble to react with sulfates in the drilling fluid.

14. In the art of drilling wells by the employment of an aqueous mud-laden drilling fluid, the process comprising treating a mud base containing sulfate ions, and before its conversion to a fluid, with a salt of a group consisting of the barium and strontium salts of carbonic, oxalic, orthophosphoric and tartaric acids and which salt is sufficiently soluble to react with sulfates in the drilling fluids.

15. In the art of drilling wells by the employment of an aqueous mud-laden drilling fluid, the process comprising treating a mud base containing sulfate ions, and before its conversion to a fluid, with barium carbonate.

RAYMOND W. HOEPPEL.